(12) United States Patent
Friel

(10) Patent No.: US 6,964,421 B2
(45) Date of Patent: Nov. 15, 2005

(54) WHEEL BARROW LINER

(76) Inventor: Michael Vincent Friel, 3322 Henry Dr., Newbury Park, CA (US) 91320

( * ) Notice: Subject to any disclaimer, the term of this patent is extended or adjusted under 35 U.S.C. 154(b) by 0 days.

(21) Appl. No.: 10/745,177

(22) Filed: Dec. 22, 2003

(65) Prior Publication Data

US 2004/0195140 A1 Oct. 7, 2004

Related U.S. Application Data

(63) Continuation of application No. 10/134,563, filed on Apr. 26, 2002, now abandoned.

(51) Int. Cl.[7] .................................................. B62B 1/00
(52) U.S. Cl. ................................................... 280/47.31
(58) Field of Search ........................ 280/47.26, 47.31, 280/47.33, 653, 659; 298/2, 3; D34/16

(56) References Cited

U.S. PATENT DOCUMENTS

| | | | |
|---|---|---|---|
| 2,767,886 A | | 10/1956 | Jenkins |
| 3,418,005 A | | 12/1968 | Allina |
| 3,488,091 A | | 1/1970 | Baker |
| 4,540,214 A | * | 9/1985 | Wagner ...................... 296/39.2 |
| 4,645,225 A | | 2/1987 | Eubanks |
| 4,750,776 A | * | 6/1988 | Barben ...................... 296/39.2 |
| 4,758,010 A | | 7/1988 | Christie |
| 4,850,633 A | * | 7/1989 | Emery ....................... 296/39.2 |
| 5,007,671 A | * | 4/1991 | Oprea ........................ 296/39.2 |
| 5,190,351 A | | 3/1993 | Klumpjan |
| D336,062 S | * | 6/1993 | Austin ....................... D12/221 |
| 5,221,119 A | * | 6/1993 | Emery ....................... 296/39.2 |
| 5,415,421 A | | 5/1995 | Godwin |
| 5,503,449 A | | 4/1996 | Cameron et al. |
| 5,806,909 A | | 9/1998 | Wise |
| 5,971,410 A | | 10/1999 | Nichols |
| 6,056,345 A | * | 5/2000 | Stevens ..................... 296/39.2 |
| 6,129,402 A | | 10/2000 | Carriere |
| 6,547,309 B1 | * | 4/2003 | Franklin et al. ............. 296/98 |

FOREIGN PATENT DOCUMENTS

| | | | |
|---|---|---|---|
| CA | 2226806 A | | 7/1998 |
| GB | 2241204 | * | 8/1991 |
| GB | 2365825 | * | 2/2002 |

* cited by examiner

Primary Examiner—Bryan Fischmann
(74) Attorney, Agent, or Firm—Knobbe, Martens, Olson & Bear, LLP

(57) ABSTRACT

A liner for a wheel barrow having a body that prevents materials transported in a wheel barrow from mixing with impurities lying on the bottom of the wheel barrow. The liner has a liner body. The liner body is shaped to correspond with the body of the wheel barrow. The liner body has a top edge and a lip extending around a portion of the top edge. The lip is configured to receive at least a portion of an edge of the body of the wheel barrow. The lip aids in reinforcing the fit between the liner body and the body of the wheel barrow. When material residue such as cement or debris rests on the bottom of the wheel barrow, the lip helps prevent the liner from shifting within the body of the wheel barrow. Therefore, materials in the wheel barrow are less likely to fall out of the wheel barrow during movement of the wheel barrow. The liner can be removed from the wheel barrow to transport materials to a given location.

10 Claims, 9 Drawing Sheets

WHEEL BARROW LINER

CROSS REFERENCE TO RELATED APPLICATIONS

This is a Continuation of U.S. patent application Ser. No. 10/134,563, filed Apr. 26, 2002, now abandoned, the entire contents of which are incorporated herein by reference.

BACKGROUND OF THE INVENTION

1. Field of the Invention

The present invention relates in general to wheel barrows, and relates in particular to a removable liner for a wheel barrow.

2. Description of the Related Art

Workers at a construction site or at a home repair site often use a wheel barrow to transport material such as cement. After transporting material to the desired location, the workers empty the wheel barrow. After emptying the wheel barrow, residue of the material often remains in the wheel barrow. For example, chunks of cement may remain attached to the bottom of the wheel barrow after the cement is poured from the wheel barrow. When the workers attempt to place a new batch of cement in the wheel barrow, the new batch will often mix with the impurities of the residue material attached to the bottom of the body of the wheel barrow from previous batches of cement.

Based on the foregoing, a need exists for a device that diminishes the undesirable effect of new batches of materials placed in a wheel barrow mixing with impurities attached to the bottom of the body of the wheel barrow. Workers should be able to place a new batch of materials into a relatively clean wheel barrow without contaminating the new material with old debris.

Workers also have a need for transporting the materials in the wheel barrow to remote sites. For example, workers performing repairs in a garden would like to use the wheel barrow to transport materials to an area very close to the garden. The workers do not want to wheel the wheel barrow into the garden because the wheel barrow may damage the garden as the wheel barrow is pushed through the garden. Therefore, workers need a device which provides for using a wheel barrow to transport materials up to a certain location and further provides for transporting the materials to another location without the use of the wheel barrow.

SUMMARY OF THE INVENTION

One aspect of the present invention is a liner for a wheel barrow having a body. In accordance with this aspect, the liner comprises a liner body. The liner body is shaped to correspond with the body of the wheel barrow. The liner body has a top edge and a lip extending around at least a portion of the top edge. The liner is configured to receive at least a portion of an edge of the body of the wheel barrow between the lip and the liner body. A handle is positioned on the lip. In particular embodiments, the lip extends around the outer perimeter of the top edge of the liner body. Advantageously, the lip can extend downwardly past a side edge of the body of the wheel barrow. The bottom surface of the liner body may be a distance from the bottom surface of the body of the wheel barrow.

Another aspect of the present invention is a method for transporting materials with the use of a wheel barrow liner. In accordance with this aspect, the method comprises placing a wheel barrow liner in a wheel barrow; placing materials in the wheel barrow liner; moving the wheel barrow to a first location; removing the wheel barrow liner from the wheel barrow; and carrying the wheel barrow liner to a second location. In particular embodiments, the lip is fitted over an edge of the wheel barrow when the wheel barrow liner is placed in the wheel barrow.

In yet another aspect of the present invention, there is a method for making a liner for a wheel barrow having a body. In accordance with this aspect, the method comprises molding a material to the shape of the body of the wheel barrow; and molding a material to form a lip over the top edge of the body of the wheel barrow. In particular embodiments, the method further comprises the step of molding a material to form a handle positioned on the lip.

BRIEF DESCRIPTION OF THE DRAWINGS

The preferred embodiments of a wheel barrow liner will now be discussed in detail. These embodiments depict the novel and non-obvious wheel barrow liner for placement in a wheel barrow shown in the accompanying drawings, which are for illustrative purposes only. These drawings include the following figures, in which like numerals indicate like parts.

DETAILED DESCRIPTION OF THE PREFERRED EMBODIMENTS

Embodiments of the present invention are described in detail below with reference to the figures, wherein like elements are referenced with like numerals throughout.

Figure 1:
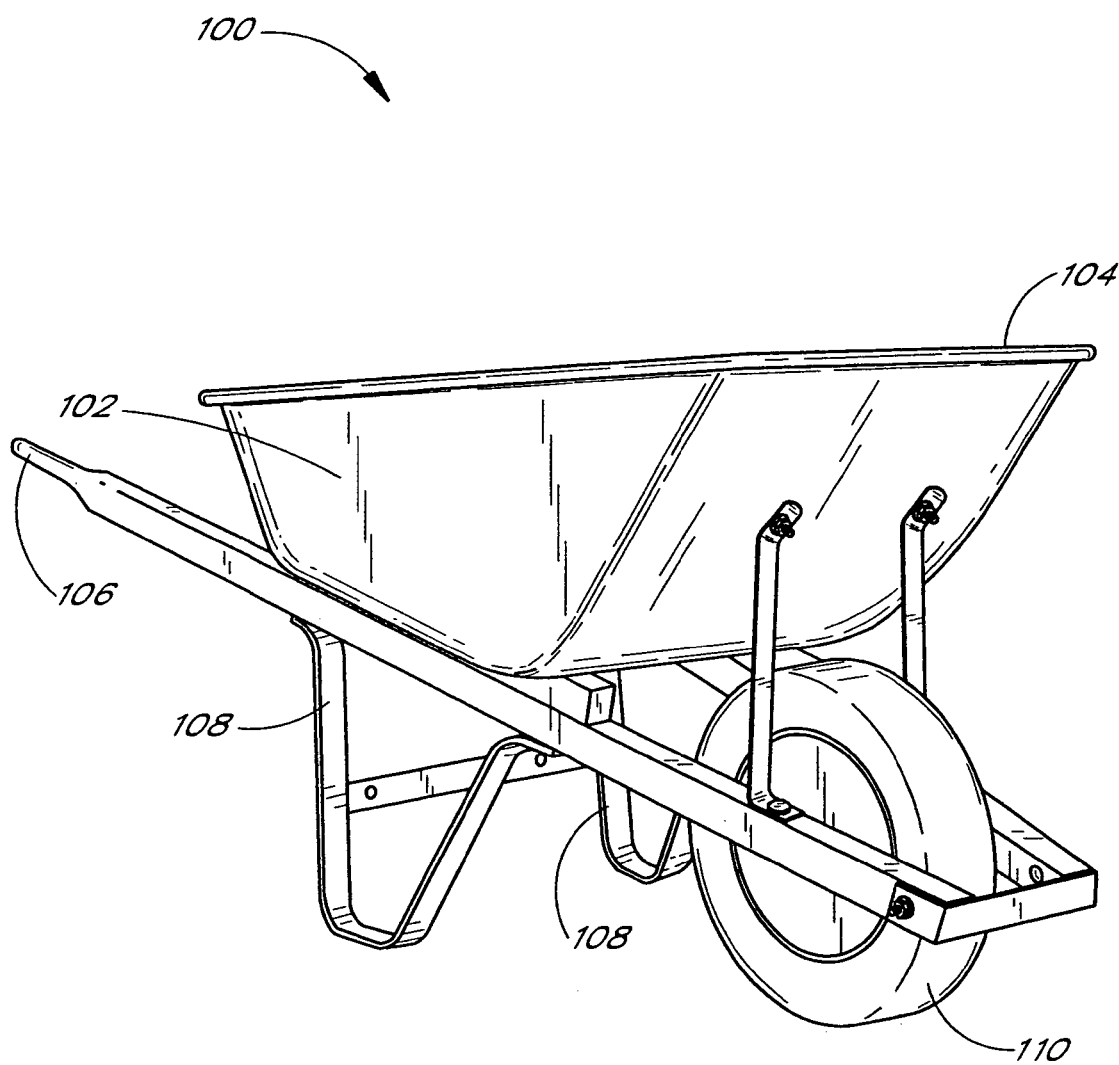
FIG. 1 illustrates a perspective view of a wheel barrow that is used for transporting materials.

FIG. 1 illustrates a wheel barrow 100 that is used for transporting materials. In one context, construction workers use the wheel barrow 100 to transport cement to different locations at a construction site. In other contexts, the wheel barrow 100 can be used to transport a variety of other items such as, for example, wood, dirt, parts, tools, etc.

The materials to be transported are placed in a body 102 of the wheel barrow. The materials are initially placed or poured into a bottom 103 (FIG. 2) of the body 102. If the wheel barrow 100 is being used for transporting cement, a worker can mix the cement within the body 102 (FIG. 2) after the cement is poured into the body 102. With the wheel barrow 100 illustrated in FIG. 1, the worker can transport the cement or other materials by grabbing handles 106 and lifting legs 108 of the wheel barrow 100 off of the ground. The wheel barrow 100 allows a worker to leverage the weight of the materials and move the materials with the use of a wheel 110.

Once a worker reaches the location he or she wishes to transport the materials to, the worker can tip the body 102 over the wheel 110 or to the side in order to pour the materials out over a top edge 104 of the body 102. A bottom edge 109 (FIG. 3) and a side edge 113 (FIG. 3) help prevent the materials from running down the sides of the body 102. Some materials may remain attached to the bottom 103 (FIG. 2) after the construction worker pours the materials out.

Figure 2:
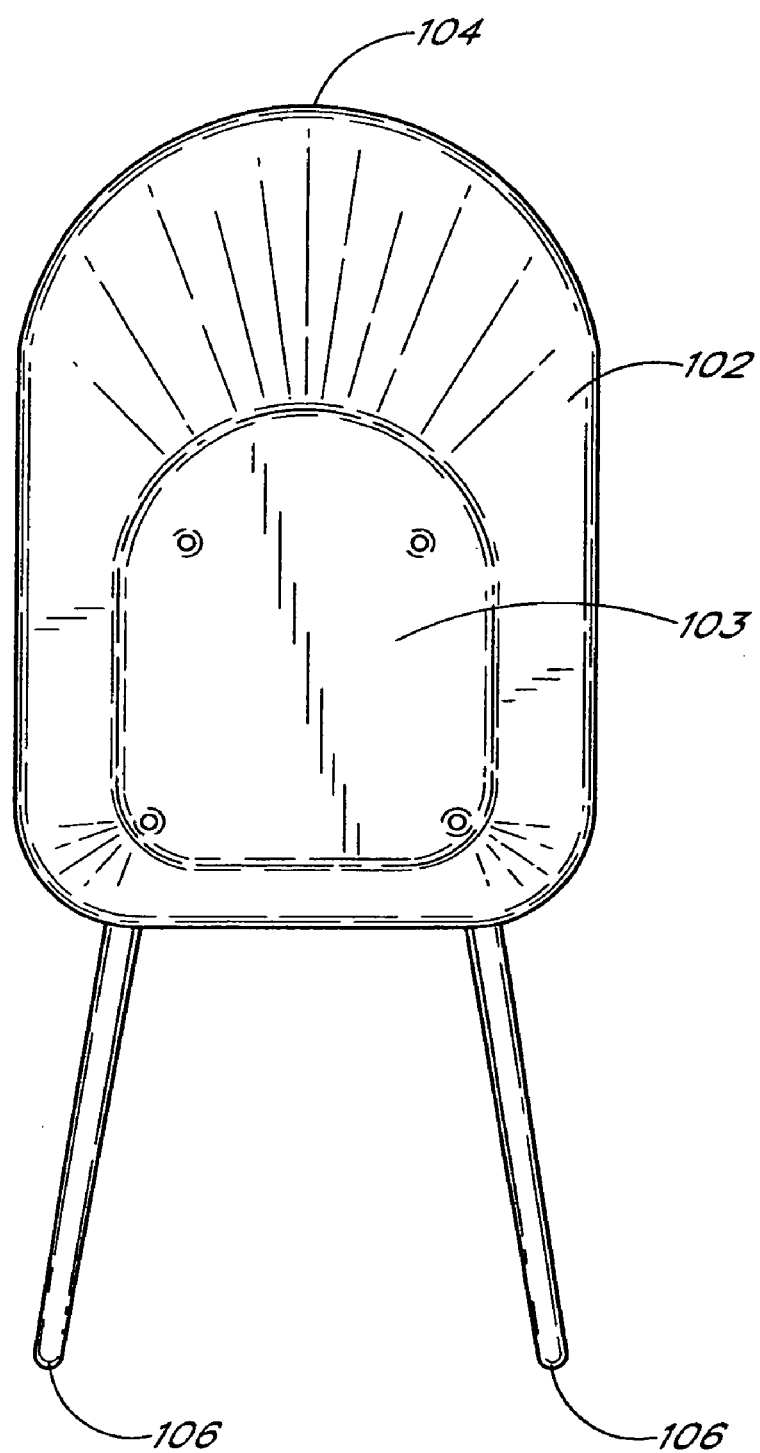
FIG. 2 illustrates a top view of the wheel barrow in FIG. 1.

FIG. 2 illustrates a top view of the wheel barrow 100 illustrated in FIG. 1. The dimensions of the body 102 for the most common wheel barrow used are a length of 38 ½" and a width of 25 ⅜". The body 102 has a depth of 12 ⅜" at the deepest part of the body 102 and a depth of 8 ⅜" at the most rearward portion of the body 102, which is the portion of the body 102 near the handles 106. The distance from the top edge 104 to the floor at the front portion of the body 102, which is the portion of the body near the wheel 110, is 26 ⅞". The distance from the top edge 104 to the floor at the rear portion of the body 102 is 24 ½". The body 102 can hold 6 cubic feet of material.

A smaller version of the body 102 has a length of 36½" and a width of 26 ¾". The body 102 has a depth of 7 ¾" at the deepest part of the body 102 and a depth of 5 ½" at the most rearward portion of the body 102. The distance from the top edge 104 to the floor at the front portion of the body 102 is 22 ½". The distance from the top of the edge 104 to the floor at the rear portion of the body 102 is 22". The body 102 can hold 4 cubic feet of material. Of course, wheel barrows of any size or shape can be used with the present invention.

Materials residue 602 (FIG. 6) such as, for example, cement chunks or debris can become attached to the bottom 103 or the sides of the body 102. To avoid impurities in new batches of cement mix, construction workers usually have to clean the bottom 103. Even after cleaning the bottom 103, some residue of the chunks may still remain. Therefore, the labor required to clean the bottom 103 may not remove the potential for impurities.

Figure 3:
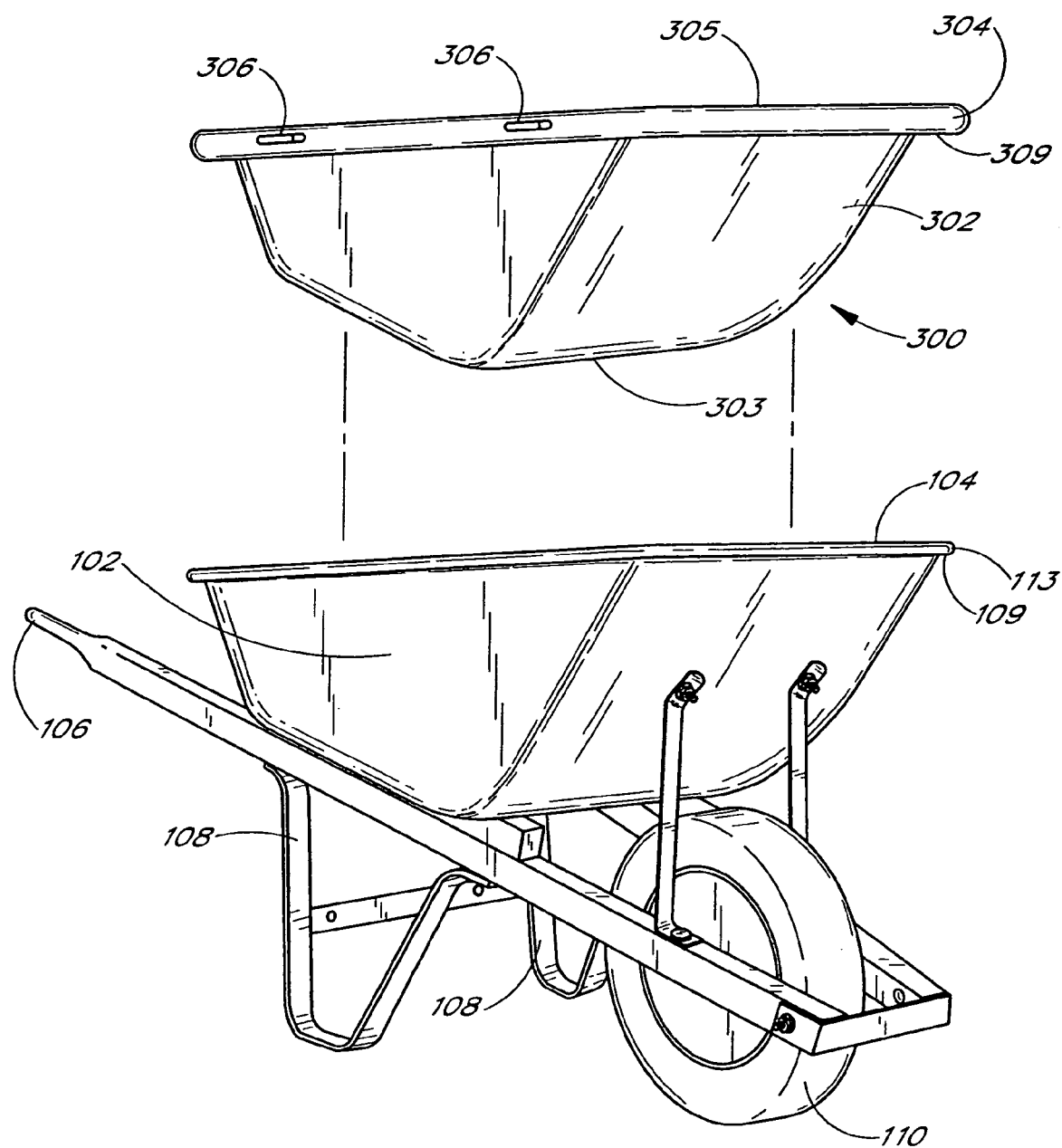
FIG. 3 illustrates a wheel barrow liner to be inserted in the wheel barrow of FIG. 1.

FIG. 3 illustrates a wheel barrow liner 300 to be inserted in the wheel barrow 100. The wheel barrow liner 300 has a body 302, a bottom 303, handles 306, and a lip 304 having a top edge 305 and a bottom edge 309. As will be discussed with respect to FIG. 5, in one embodiment, the body 302 is molded to nest within the body 102 for a close fit. The liner 300 can be manufactured through a molding process or any one of a variety of processes recognized by one of ordinary skill in the art. The lip 304 and the handles 306 can be molded as part of the liner 300. The wheel barrow liner 300 can be manufactured from plastic or any other material which can be molded to the shape of the body 102. By inserting the wheel barrow liner 300 into a wheel barrow 100, the longevity of the wheel barrow 100 is preserved because the material residue 602 (FIG. 6) would not be permitted to attach to the bottom 103 (FIG. 2). The materials are mixed in the wheel barrow liner 300 illustrated in FIG. 3 rather than the wheel barrow 100. When using the wheel barrow liner 300 with a new wheel barrow 100, the bottom 103 can remain substantially free of material residue 602 (FIG. 6) because the materials are placed within the wheel barrow liner 300 and do not touch the bottom 103 or the sides of the body 102. When using the wheel barrow liner 300 with an older wheel barrow 100, the wheel barrow liner 300 prevents material in addition to the material already attached to the bottom 103 from attaching to the bottom 103. The wheel barrow liner 300 can lie on top of the material residue 602 (FIG. 6) while the new material is poured into the wheel barrow liner 300. Therefore, the new materials placed into the wheel barrow liner 300 do not come into contact with the material residue 602 present in the wheel barrow 100.

Further, the wheel barrow liner 300 is preferably easier to clean than the body 102. One of ordinary skill in the art will recognize that materials such as cement and debris are less likely to adhere to many plastics than to many metals. In the embodiment wherein the liner 300 is manufactured from plastic, material residue will generally not adhere to the bottom 303 of the liner 300 as much as the material residue 602 would adhere to the bottom 103 of the wheel barrow 100. Cement chunks or debris will generally adhere more to the metal surface of the wheel barrow 100 than the plastic surface of a wheel barrow liner 300. Therefore, the body 302 is advantageously easier to clean than the body 102.

The lip 304 illustrated in FIG. 3 is preferably shaped so that a space is created between the bottom edge 309 and the body 302. The lip 304 is designed to receive the top edge 104 of the lip 304 in the space created between the lip 304 and the body 302 if there is no material residue 602 (FIG. 6) lying on the bottom 103 of the wheel barrow 100. If the material residue 602 (FIG. 6) lies on the bottom 103, the lip 304 may not be able to receive the top edge 104 because the liner body 300 may not be able to completely nest within the body 102. The contact that the lip 304 makes with the side edge 113 diminishes movement of the lip 304 with respect to the side edge 113, thereby causing less movement of the body 302 with respect to the body 102. The body 302 shifting less with respect to the body 102 is advantageous because the materials are subject to less movement inside the wheel barrow liner 300 and are less likely to be thrown from the wheel barrow as a result of the body 302 shifting from one side to the other.

Figure 6:
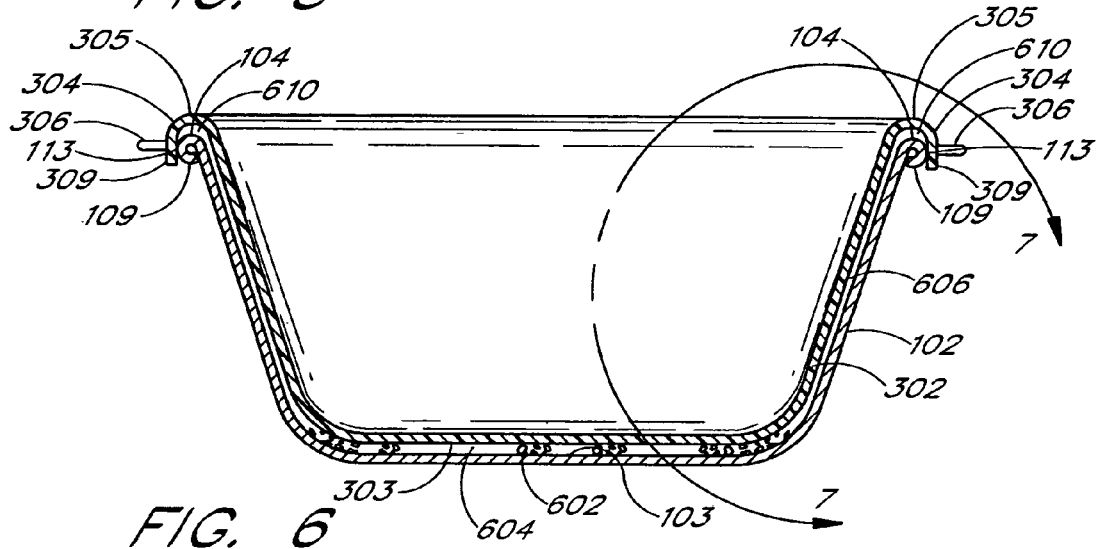
FIG. 6 illustrates a cross section of the embodiment illustrated in FIG. 5 where a residue of materials rests on the bottom of the body of the wheel barrow.

As illustrated in FIG. 6, the bottom edge 309 extends down past the top edge 104. The bottom edge 309, for example, could be of a length so as to extend 3 inches past the bottom edge 109. Of course, the bottom edge 309 can extend any length that would help one skilled in the art make the fit between the body 302 and the body 102 more secure.

In one embodiment, the lip 304 illustrated in FIG. 3 extends circumferentially around the entire portion of the top edge 305 and covers the entire perimeter of the top edge 104. This embodiment provides for the lip 304 receiving the top edge 104 around the whole perimeter of the edge 104. Therefore, the body 302 will not move much with respect to the body 102. In another embodiment, the lip 304 only extends circumferentially around a portion of the top edge 305. This embodiment provides for a less expensive wheel barrow liner 300 to manufacture because less of a lip needs to be formed around the perimeter. At the same time, the lip 304 covering a portion of the perimeter of the edge 104 provides sufficient reinforcement for the fit between the lip 304 and the top edge 104. Whether the lip 304 extends circumferentially around the entire perimeter or only a portion of the top edge 104, the lip 304 has an additional function. The lip 304 advantageously prevents debris, dirt, or cement from getting caught between the body 102 and the body 302 when materials are transported or are poured in or out of the liner 300 while the liner 300 lies in the wheel barrow 100. The lip 304 covers a space 610 (FIG. 6) that may exist between the top edge 305 and the top edge 104. Without the lip 304, materials might leak over the top edge 305 and enter the space 610 between the top edge 305 and the top edge 104. The materials could then possibly leak down the sides of the body 102 to the bottom 103. Therefore, the lip 304 helps prevent new material residue 602 (FIG. 6) from forming on the sides of the body 102 and the body 103.

In one embodiment, handles 306 as illustrated in FIG. 3 are attached to the sides of the lip 304. One or more handles 306 are positioned on each side of the lip 304. A worker on each side can then use his or her right hand and left hand to grab both handles 306. In yet another embodiment, the handles 306 are attached to the top edge 305. In another embodiment, the handles 306 are attached to the inner surface of the body 302. A worker reaches inside of the body 302 to grip the handles in order to pull the body 302 out of the body 102.

The wheel barrow 100 can at times only be conveniently transported to a location close to the desired location rather than the desired location itself. For instance, workers cannot transport the wheel barrow 100 across a garden, but the workers can transport the wheel barrow to a location close to the garden and transport the wheel barrow liner 300 from the wheel barrow 100 to the desired location in the garden. The workers transport the wheel barrow liner 300 by removing the wheel barrow liner 300 with the use of the handles 306. After the workers transport the wheel barrow liner 300 to the desired location the workers then pour the materials out of the wheel barrow liner 300.

In one embodiment, the handles 306 are made out of the same material as the wheel barrow liner 300. In another embodiment, the handles 306 are a portion of a unitary structure which includes the body 302. In yet another embodiment, the handles 306 are detachable from and attachable to the wheel barrow liner 300.

Figure 4:
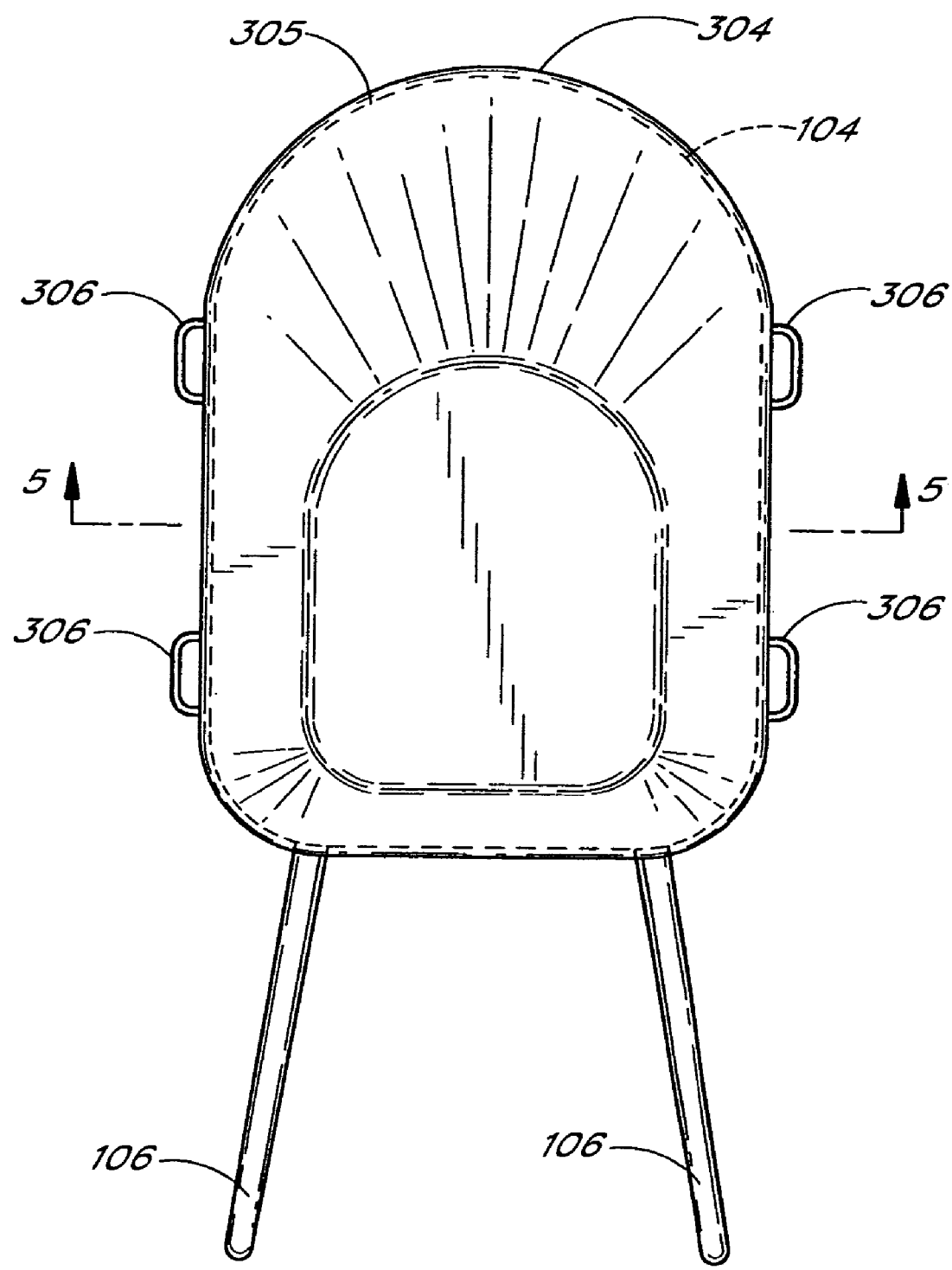
FIG. 4 illustrates a top view of the wheel barrow liner fitted within the wheel barrow of FIG. 1.

FIG. 4 illustrates a top view of the wheel barrow liner 300 fitted within the wheel barrow 100. The lip 304 is designed to fit over the top edge 104.

Figure 5:
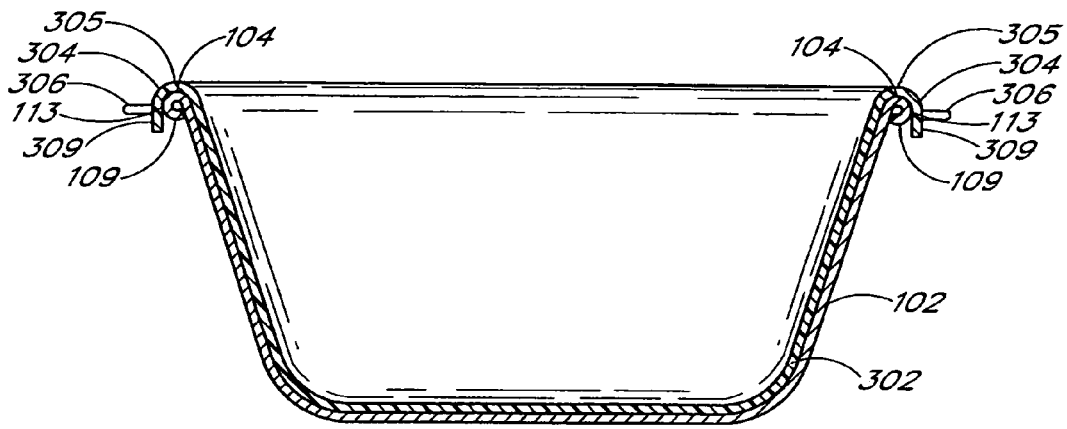
FIG. 5 illustrates a cross section of one embodiment of the wheel barrow liner lying within the wheel barrow.

FIG. 5 illustrates a cross section of one embodiment of the wheel barrow liner. 300 lying within the wheel barrow 100. The body 302 is molded in the shape of the body 102 to nest within the body 102. When the body 102 is clean, the body 302 shifts infrequently because it is molded in the shape of the body 102. For further reinforcement, the lip 304 is molded to receive the edge 104.

In one embodiment, the handles 306 can be used to fit the lip 304 over the top edge 104 so that the lip 304 engages the top edge 104. A construction worker can pull or push down on the handles 306 to help ease the lip 304 over the top edge 104.

FIG. 6 illustrates the embodiment of FIG. 5 where the wheel barrow 100 has some residue of materials 602 at the bottom of the body 102 from materials that were previously transported in the wheel barrow 100. The body 302 cannot nest within the body 102 because the material residue 602 rests on the bottom 103. Therefore, the bottom 303 rests on top of the material residue 602. The body 302 is elevated by the material residue 602 on the bottom 103. As a result, spaces are created between the body 102 and the body 302. Therefore, the space 610 is created between the top edge 305 and the top edge 104. These spaces prevent the body 302 from completely nesting within the body 102, thereby preventing the top edge 305 from making contact with the top edge 104. If no material residue 602 rested on the bottom 103, the bottom edge 309 would slide past the side edge 113 as the body 302 is placed within the body 102. Because the material residue 602 rests on the bottom 103, the bottom edge 309 is advantageously in contact with the side edge 113. The contact between the bottom edge 309 and the side edge 113 prevents the shifting of the body 302 that would occur if the lip 304 did not have a portion that extended downwardly past the side edge 113 when no material residue 602 is present in the bottom 103.

Figure 7:
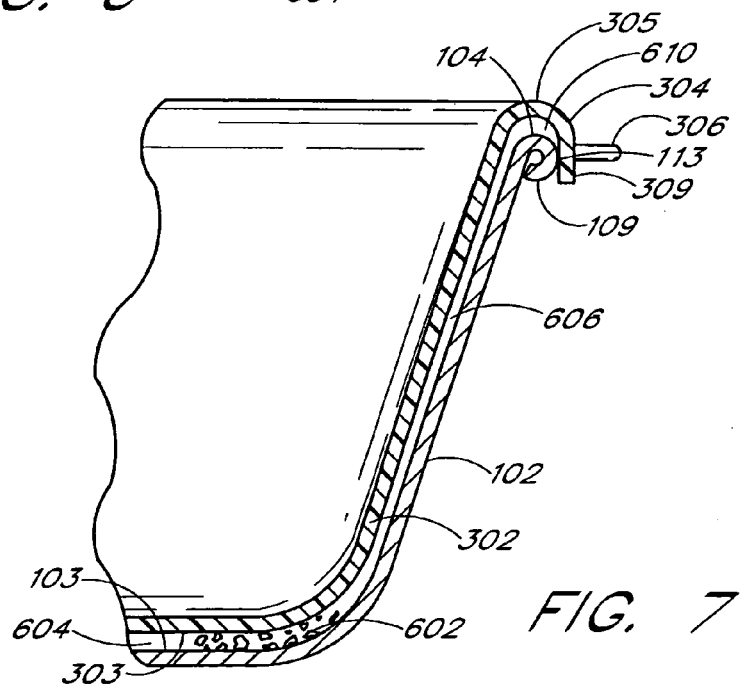
FIG. 7 shows an enlarged view of the side and bottom walls of the embodiment illustrated in FIG. 6.

FIG. 7 is an enlarged view of the side and bottom walls of the embodiment illustrated in FIG. 6. Because the body 302 rests on the material residue 602, a space 604 is created between the bottom 303 and the inner surface of the bottom 103. Further, a space 606 is created between the side walls of the body 102 and the side walls of the body 302. In addition, the space 610 is created between the top edge 305 and the top edge 104. These spaces would normally allow the liner 300 to shift within the body 102. In other words, the body 302 would not be in as stable a position as possible. The body 302 could shift, completely to one side of the wheel barrow 100. When the wheel barrow 100 passes over a bump, the body 302 may come partially out of the wheel barrow 100 causing the materials to be thrown from the wheel barrow 100.

As seen in FIGS. 6 and 7, the lip 304 is designed to preferably extend vertically downward beyond the side edge 113 in order to account for the spacing effect of the material residue 604. In the case that the spacing effect occurs, the lip 304 has a bottom edge 309 which extends past the side edge 113 when the inner surface of the bottom 103 is clean so that the lip 304 will be in contact with the side edge 113 when the liner 300 is in an elevated position. In one embodiment, the lip 304 is molded so that it maintains contact with the side edge 113 when the body 302 rests within the body 102 and maintains increased contact with the side edge 113 when the body 302 is elevated from the body 102.

Figure 7A:
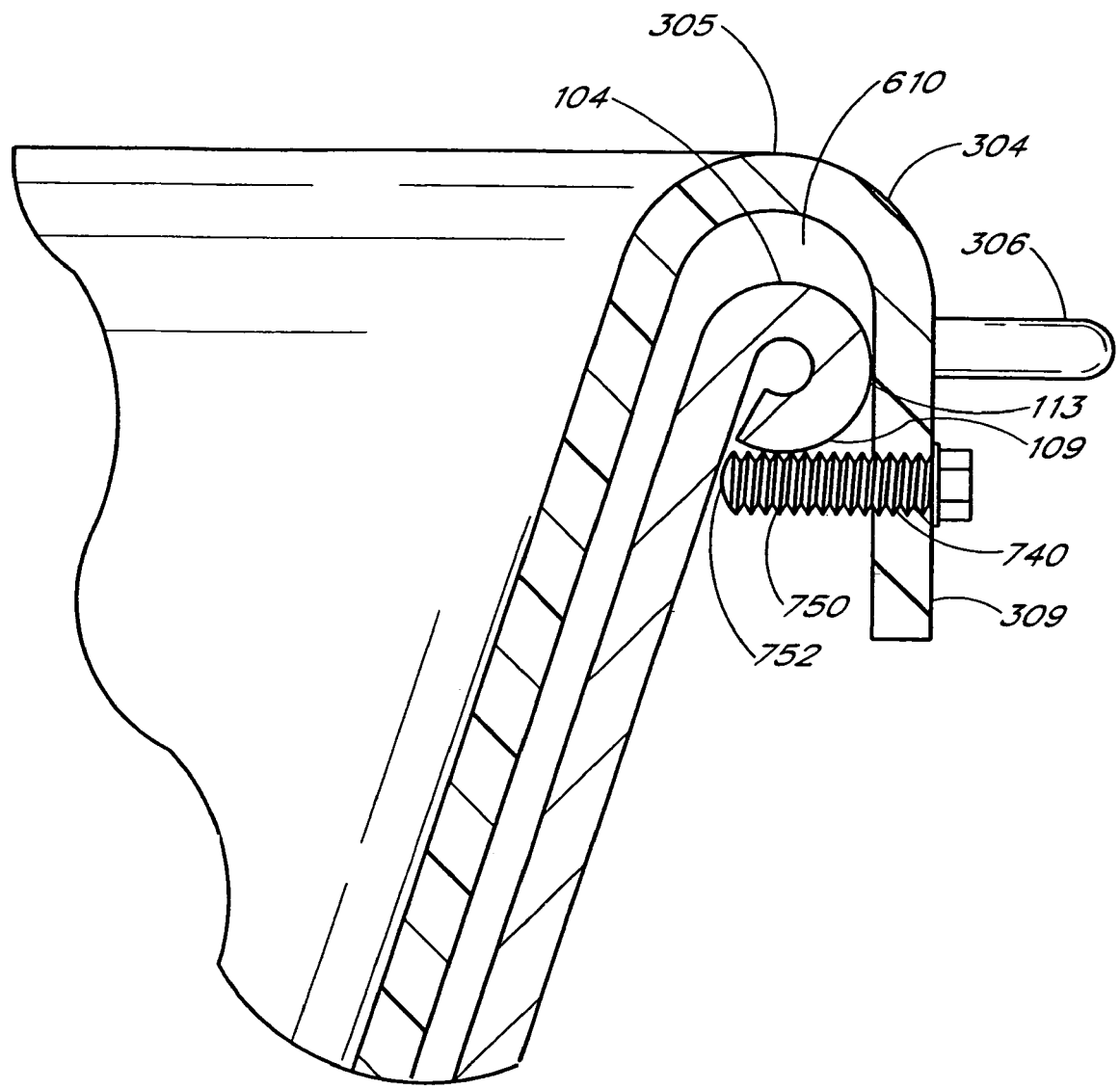
FIG. 7A shows an enlarged view of an embodiment with a pre-drilled hole for receiving a securing means to better reinforce the fit between the liner body and the body of the wheel barrow.

FIG. 7A shows an enlarged view of an embodiment with a pre-drilled hole for receiving a securing means to better reinforce the fit between the liner body 300 and the body 102. A hole 740 in the lip 304 is pre-drilled so that a securing means 750 can be used to reinforce the fit between the liner 300 and the body 102. The securing means 750 such as, for example, a screw, bolt, nail, pin, etc. can be placed through hole 740. In one embodiment, the hole 740 is threaded for receiving a threaded securing means 750 such as, for example, a screw or bolt. The end of the securing means 752, which is closest to the body 102, makes contact with the body 102 to reinforce the fit between the liner 300 and the wheel barrow 100. The end of the securing means 752 advantageously has a rounded end in order to avoid damaging the exterior of the body 102.

The hole 740 does not have to be pre-drilled. The hole 740 can be made with any known method to one of ordinary skill in the art. Further, the hole 740 can be threaded for use with various types of fasteners.

Figure 8:
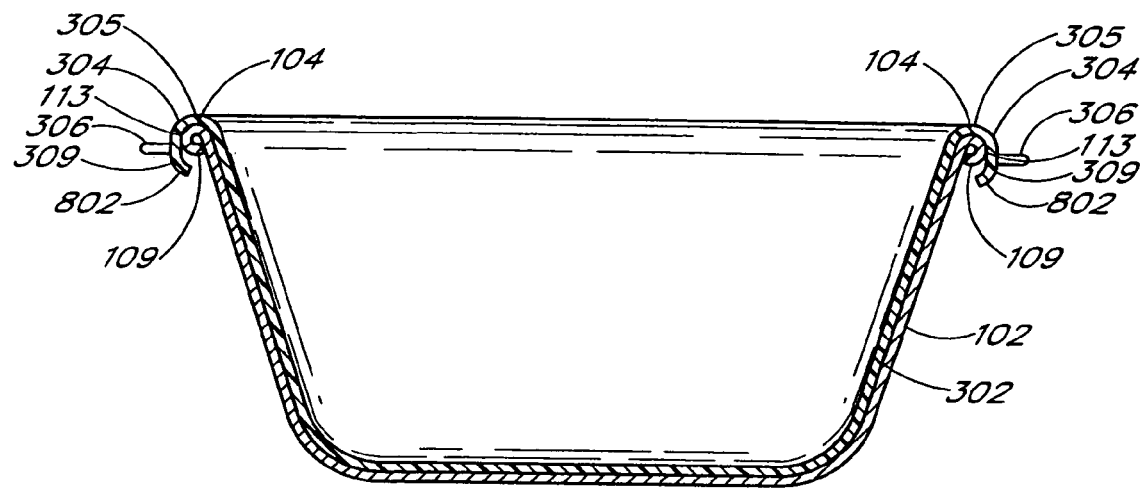
FIG. 8 illustrates a cross section of another embodiment of the wheel barrow liner lying within the wheel barrow.

FIG. 8 illustrates a cross section of another embodiment of the wheel barrow liner 300 lying within the wheel barrow 100. This embodiment is similar to the embodiment of FIG. 5 with the lip 304 having a hook portion 802 adjacent to the bottom edge 309. The hook portion 802 is shaped so that the bottom edge 109 nests within the hook portion 802. In one embodiment, the bottom edge 109 has a semicircular shape and the hook portion 802 also has a semicircular shape so that the bottom edge 109 nests within the hook portion 802. If no material residue 602 rests on the bottom 103, the hook portion 802 may not come in contact with the bottom edge 109. The liner 300 nests within the body 102 to prevent shifting of materials.

Figure 9:
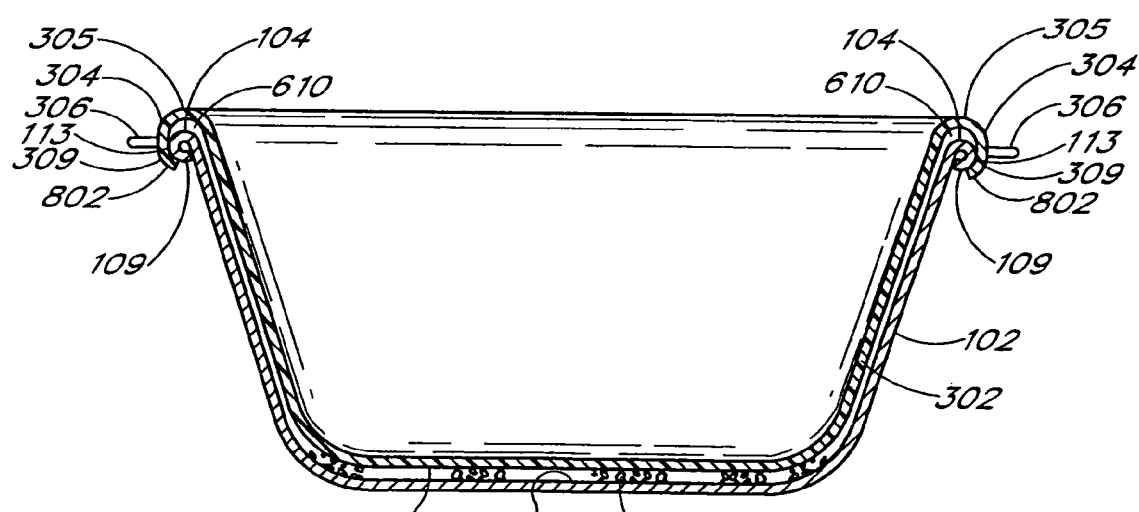
FIG. 9 illustrates a cross section of the embodiment illustrated in FIG. 8 where the residue of materials rests on the bottom of the body of the wheel barrow.

FIG. 9 illustrates a cross section of the embodiment illustrated in FIG. 8 where residue of materials 602 rests on the bottom 103. As a result of the material residue 602 resting on the bottom 103, a worker cannot slide the bottom edge 309 downwardly past the bottom edge 109. Therefore, space 610 is created between the top edge 305 and the top edge 104. To help prevent the liner 300 from shifting, the hook portion 802 contacts the side edge 113.

The hook portion 802 can be made from any variety of materials known to one of ordinary skill in the art such as, for example, plastic or metal. In one embodiment, the hook portion 802 is a molded portion of the lip 305. In another embodiment, the hook portion 802 can be attached and detached from the lip 304.

Figure 10A:
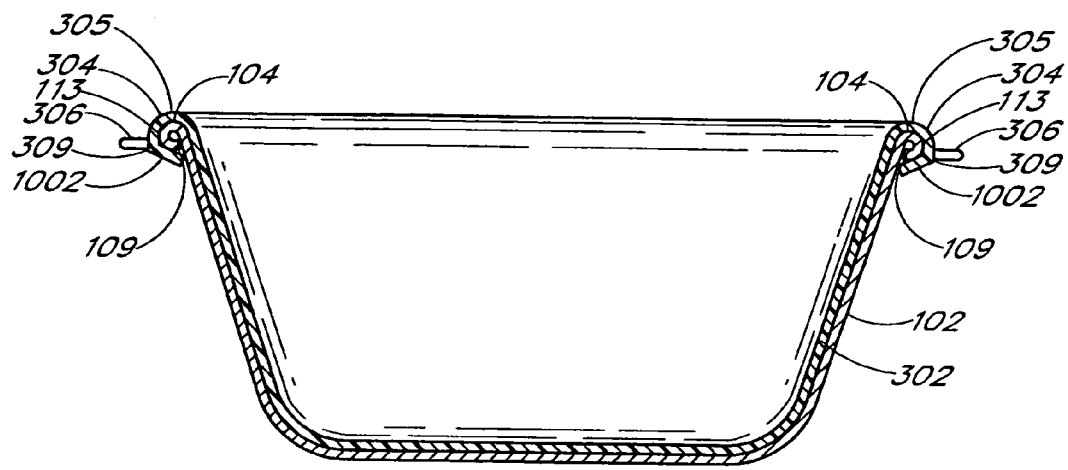
FIG. 10A illustrates a cross section of another embodiment of the wheel barrow liner lying within the wheel barrow.
Figure 10B:
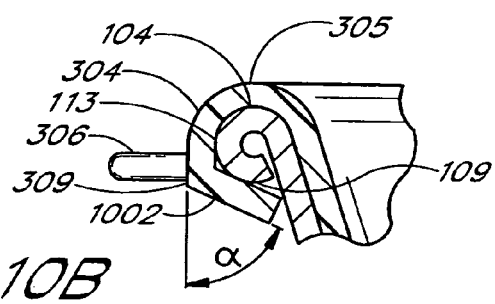
FIG. 10B shows an enlarged view of an angled flap illustrated in FIG. 10A engaged with an edge of the body of the wheel barrow at an angle $\alpha$.

FIG. 10A illustrates a cross section of another embodiment of the wheel barrow liner 300 lying within the wheel barrow 100. This embodiment is similar to the embodiment of FIG. 5 with a lip 304 that additionally has an angled flap 1002 attached to the bottom edge 309. In FIG. 10A, there is no material residue 602 resting on the bottom 103. In one embodiment, the angled flap 1002 is made from a flexible material. When a worker attempts to place the liner 300 in the body 102, the worker can pull back the flap 1002 in the direction away from the wheel barrow and place the liner 300 in the body 102. The worker then releases the flap 1002 which then partially surrounds the side edge 113 and the bottom edge 109. FIG. 10B shows an enlarged view of the angled flap 1002 partially surrounding the side edge 113 and the bottom edge 109 at an angle α.

Figure 11A:
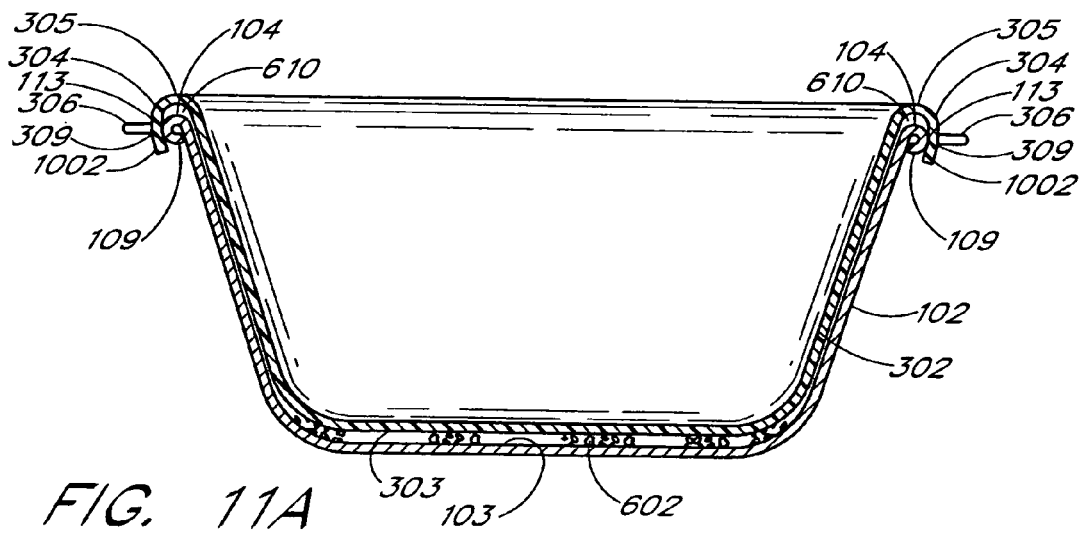
FIG. 11A illustrates a cross section of the embodiment illustrated in FIG. 10A where the residue of materials rests on the bottom of the body of the wheel barrow.
Figure 11B:
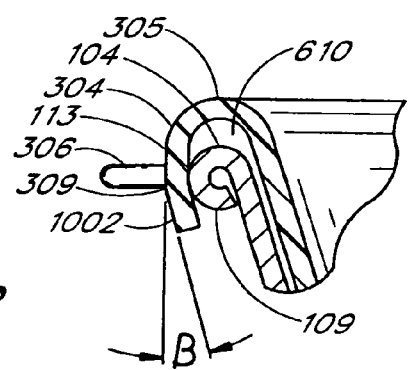
FIG. 11B shows an enlarged view of an angled flap illustrated in FIG. 11A where the residue of materials rests on the bottom of the body of the wheel barrow.

FIG. 11A illustrates a cross section of the embodiment illustrated in FIG. 10A where the residue of materials 602 rests on the bottom 103 of the body 102. The worker pulls the flap 1002 back in the direction away from the wheel barrow 100 in order to place the liner 300 within the body 102. But the worker cannot place the liner 300 completely within the body 102 because the material residue 602 rests on the bottom 103. As a result of the material residue 602 resting on the bottom 103, when the worker releases the flap 1002, the flexible angled flap 1002 contacts the side edge 113 at an angle β which may be smaller than the angle α. FIG. 11B shows an enlarged view of the angled flap 1002 engaged with the edge 104 at an angle β. The angled flap 1002 can be made from any variety of materials known to one of ordinary skill in the art such as, for example, plastic or metal.

Figure 12:
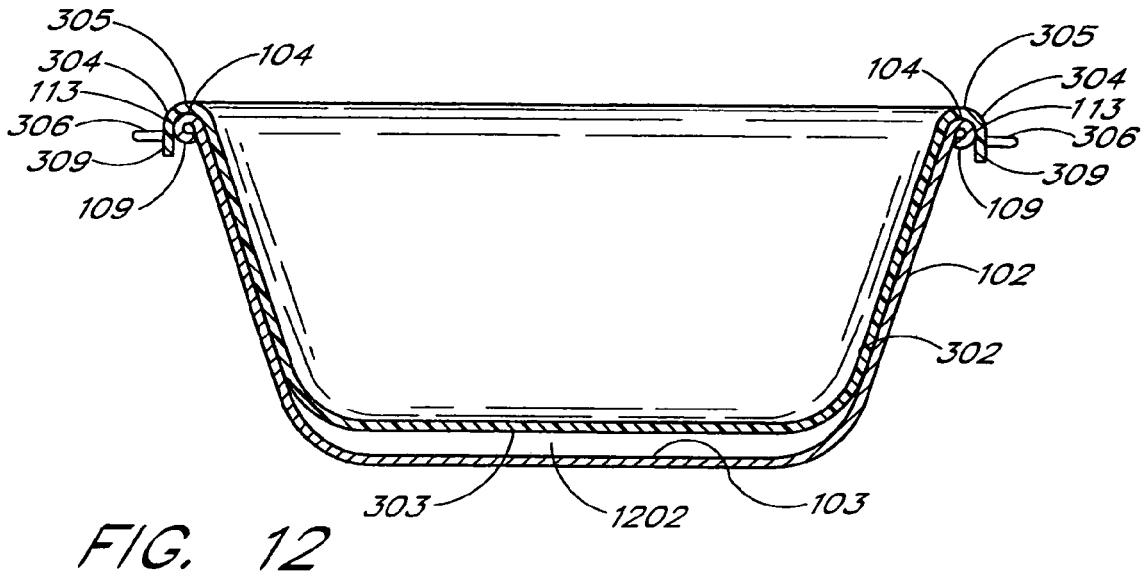
FIG. 12 illustrates a cross section of another embodiment of the wheel barrow liner lying within the wheel barrow.

FIG. 12 illustrates a cross section of one embodiment of the wheel barrow liner 300 lying within the wheel barrow 100. The body 302 nests within the body 102 to closely fit the side walls of the body 102 and leave a space 1202 between the bottom 303 and the bottom 103. The space 1202 is created to account for the material residue 602 that may be present at the bottom of the body 102 or may form in the space 1202 over time. In one embodiment, bottom edge 309 extends downwardly past the side edge 113 for added reinforcement. When the space 1202 accommodates all the material residue 602, the top edge 304 engages the top edge 104 and the bottom edge 309 extends downwardly past the side edge 113.

Accordingly, the bottom edge 309 is not limited to any particular length. The bottom edge 309 can extend vertically downward past the side edge 113 any length down to the ground. In one embodiment, the bottom edge 309 does not need to extend past the side edge 113. The space 1202 is generally large enough to account for the material residue 602. In this embodiment, a space will generally not form between the top edge 104 and the top edge 305 because the space 1202 allows the liner 300 to nest within the body 102 even when a sufficient amount of material residue 602 is present. Therefore, the close fit between the side walls of the body 302 and the body 102 provides sufficient reinforcement to prevent movement of the body 302 without the need of the bottom edge 309 extending downward much beyond the side edge 113.

Figure 13:
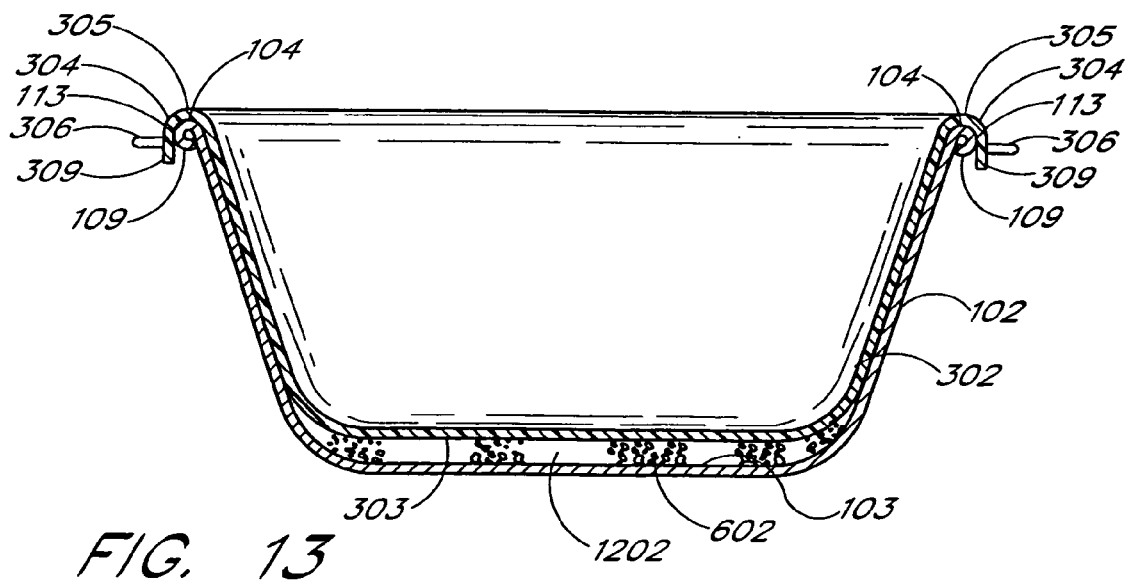
FIG. 13 illustrates the embodiment of FIG. 12 where the wheel barrow has some residue of materials at the bottom of the body from materials that were previously transported in the wheel barrow 100.

FIG. 13 illustrates the embodiment of FIG. 12 where the wheel barrow 100 has some residue of materials 602 at the bottom of the body 102 from materials that were previously transported in the wheel barrow 100. The liner 300 nests within the body 102 because the space 1202 provides room for the material residue 602 to rest on the bottom of the body 102. The body 302 rests on top of the material residue 602 without creating spaces between the side walls of the body 102 and the body 302.

However, a large amount of the material residue 602 may be greater in height than the space 1202, thereby leading to an elevation of the body 302. If the amount of material residue 602 is not accommodated by the space 1202, a space would be created between the top edge 305 and the top edge 104. Advantageously, the bottom edge 309 would maintain contact with the side edge 113 Therefore, the liner 300 is not likely to shift even if there is an amount of material residue 602 that does not fit within the space 1202.

The various embodiments of the wheel barrow liner 300 described herein address and solve the problems associated with conventional wheel barrows. The wheel barrow liner described herein eliminates materials that are transported being mixed with impurities resulting from materials that were previously transported adhering to the inner surface of the wheel barrow 100. Materials no longer need to be placed on the bottom 103. The materials can be placed in the bottom 303 without contacting the bottom 103. Therefore, the bottom 103 does not need to be cleaned nearly as often as it would if there was no liner 300. Although, the liner 300 would need to be cleaned, the liner 300 is preferably easier to clean because it is made of plastic, which is less likely to retain debris therein. Further, the liner is likely less expensive than the wheel barrow 100. So in the possible event that after years of use, the liner 300 becomes difficult to clean, the liner can be replaced at a cost much less than the cost of replacing the wheel barrow 100.

In addition, various embodiments of the liner 300 address and solve the problem of transporting materials to areas in which a wheel barrow may do damage, such as, for example, a garden. The wheel barrow 100 can be moved to a destination remote from the final destination, and workers can lift the liner 300 out of the wheel barrow 100 to transport the materials to the final destination. The wheel barrow 100 would be useful for transporting the materials the majority of the way, and the liner 300 would provide the added benefit of providing for transportation at the latter part of the trip. Even if the materials are heavy, the liner 300 provides for workers being able to lift and carry the materials. Workers can position themselves on each side of the wheel barrow 100 and grab the handles 306. If the materials are too heavy for one or two workers, more workers can assist with removing the liner 300. Various embodiments provide different numbers of handles to provide for workers removing the materials in a convenient fashion. With multiple workers located on the sides of the liner 300, the materials should be able to be conveniently transported.

SCOPE OF THE INVENTION

The above presents a description of the best mode contemplated for the present wheel barrow liner, and of the manner and process of using it, in such full, clear, concise and exact terms as to enable any person skilled in the art to which it pertains to use this wheel barrow liner. This wheel barrow liner is, however, susceptible to modifications and alternate constructions from that discussed above which are fully equivalent. Consequently, it is not the intention to limit this wheel barrow liner to the particular embodiments disclosed. On the contrary, the intention is to cover all modifications and alternate methods of operation coming within the spirit and scope of the wheel barrow liner as generally expressed by the following claims, which particularly point out and distinctly claim the subject matter of the wheel barrow liner.

What is claimed is:

1. A liner for a wheel barrow having a body, the liner comprising:
   a liner body, the liner body shaped to correspond with the body of the wheel barrow, the liner body having a top edge and a lip extending around an entire perimeter of the top edge, the liner body configured to surround a portion of an edge of the body of the wheel barrow between the lip and the liner body; and
   at least one handle positioned on the lip;
   wherein, the lip comprises a hooked portion or an inwardly angled flap which surrounds a bottom surface of the edge of the wheel barrow so as to secure the liner, and wherein at least the lip is formed of a flexible material such that the lip is configured to flex outward as the handle is pulled upwards.

2. The liner of claim 1, wherein a distance between the lip of the liner and the bottom surface of the liner body is less than a distance between an upper surface of the edge of the wheel barrow and the bottom surface of the body of the wheel barrow, whereby the bottom surface of the liner body is supported some distance above the bottom surface of the wheel barrow body.

3. The liner of claim 1, wherein the lip comprises a hook portion with a semicircular cross-section selected to correspond to a semi-circular cross-section of a wheel barrow edge.

4. The liner of claim 1, wherein the lip comprises an inwardly angled flap which contacts a side surface of the edge of the wheel barrow at an angle of less than 180°.

5. The liner of claim 1, wherein at least one handle is positioned on each side of the liner body.

6. The liner of claim 1, wherein a first side of the liner body has a pair of handles for an individual to use two hands to remove the liner body from the body of the wheel barrow.

7. The liner of claim 6, wherein a second side of the liner body has a second pair of handles for a second individual to work in conjunction with the first individual in removing the liner body from the body of the wheel barrow.

8. The liner of claim 7, wherein the lip comprises a hooked portion or an inwardly angled flap which surrounds a bottom surface of the edge of the wheel barrow adjacent each handle.

9. The liner of claim 1, wherein the liner body is shaped to correspond to the body of the wheel barrow through a molding process.

10. The liner of claim 1, wherein the lip has a hole for receiving a securing means.

* * * * *